US010798311B2

(12) United States Patent
Somayaji et al.

(10) Patent No.: US 10,798,311 B2
(45) Date of Patent: Oct. 6, 2020

(54) METHODS AND APPARATUS FOR REDUCING SPATIAL FLICKER ARTIFACTS

(71) Applicant: SEMICONDUCTOR COMPONENTS INDUSTRIES, LLC, Phoenix, AZ (US)

(72) Inventors: Manjunath Somayaji, Santa Clara, CA (US); Rohit Ranade, Milpitas, CA (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 8 days.

(21) Appl. No.: 16/267,897

(22) Filed: Feb. 5, 2019

(65) Prior Publication Data

US 2019/0174050 A1 Jun. 6, 2019

Related U.S. Application Data

(63) Continuation of application No. 15/191,260, filed on Jun. 23, 2016, now Pat. No. 10,244,182.

(51) Int. Cl.
*H04N 5/235* (2006.01)
*G09G 5/377* (2006.01)
*G09G 5/02* (2006.01)
*H04N 9/04* (2006.01)

(52) U.S. Cl.
CPC ........... *H04N 5/2357* (2013.01); *G09G 5/026* (2013.01); *G09G 5/377* (2013.01); *H04N 5/2351* (2013.01); *H04N 5/2355* (2013.01); *H04N 9/045* (2013.01); *G09G 2320/02* (2013.01); *G09G 2320/0247* (2013.01)

(58) Field of Classification Search
None
See application file for complete search history.

(56) References Cited

U.S. PATENT DOCUMENTS

| 2006/0192867 | A1* | 8/2006 | Yosefin | H04N 5/3535 |
| | | | | 348/273 |
| 2011/0317028 | A1* | 12/2011 | Shinmei | H04N 5/2355 |
| | | | | 348/223.1 |
| 2013/0050520 | A1 | 2/2013 | Takeuchi | |
| 2014/0063294 | A1* | 3/2014 | Tatsuzawa | H04N 5/2355 |
| | | | | 348/239 |
| 2014/0153839 | A1 | 6/2014 | Tsuzuki | |
| 2014/0267815 | A1 | 9/2014 | Koizumi | |

(Continued)

FOREIGN PATENT DOCUMENTS

JP 2015551464 A1 6/2015

*Primary Examiner* — Twyler L Haskins
*Assistant Examiner* — Wesley J Chiu
(74) *Attorney, Agent, or Firm* — The Noblitt Group, PLLC; Hettie L. Haines

(57) ABSTRACT

Various embodiments of the present technology may comprise a method and apparatus for reducing spatial flicker artifacts in high dynamic range images produced from multiple image captures with differing integration times. The method and apparatus may comprise, in the image captures, measuring pixel intensity selecting pixels with a predetermined intensity thresholds, calculating a ratio based on a channel selection, normalizing the calculated ratio to an ideal ratio, and applying the normalized ratio to corresponding image pixels in a second image capture to produce a flicker-free image.

20 Claims, 10 Drawing Sheets

(56) References Cited

U.S. PATENT DOCUMENTS

Figure 1:
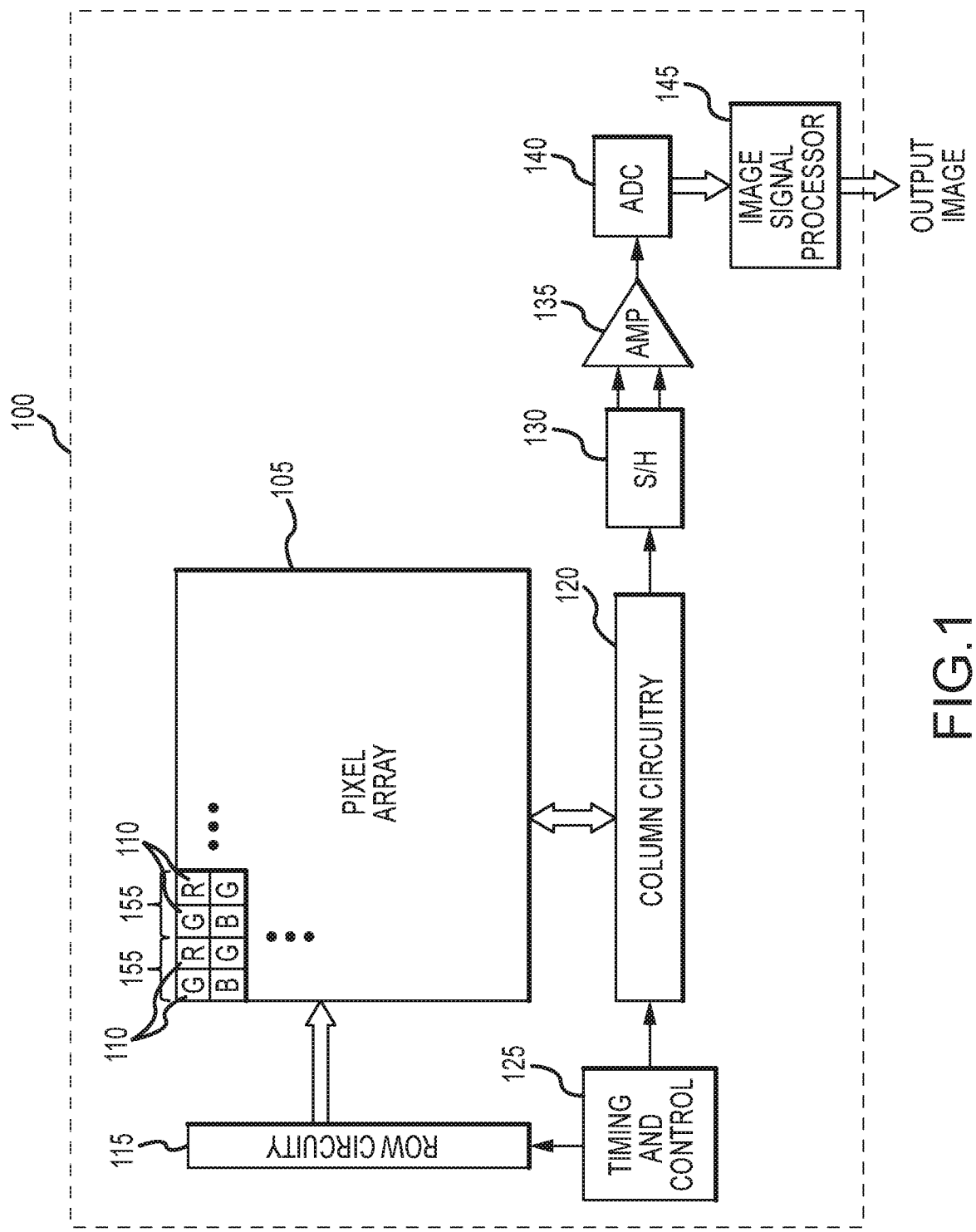

| | | |
|---|---|---|
| 2014/0354831 A1 | 12/2014 | Sheikh |
| 2015/0103209 A1 | 4/2015 | Elhachimi |
| 2016/0037043 A1* | 2/2016 | Wang .................. H04N 5/2355 |
| | | 382/275 |
| 2016/0105656 A1* | 4/2016 | Lin ....................... H04N 9/735 |
| | | 348/223.1 |
| 2017/0134634 A1 | 5/2017 | Jin |
| 2017/0150030 A1* | 5/2017 | Nakamura ........... H04N 5/2357 |

\* cited by examiner

| G11 | B1  |
|-----|-----|
| R1  | G21 |

| R2  | G22 |
|-----|-----|
| G12 | B2  |

FIG.6A

| R1  | G21 |
|-----|-----|
| G11 | B1  |

| G12 | B2  |
|-----|-----|
| R2  | G22 |

FIG.6B

| B1  | G11 |
|-----|-----|
| G21 | R1  |

| G22 | R2  |
|-----|-----|
| B2  | G12 |

FIG.6C

| G21 | R1  |
|-----|-----|
| B1  | G11 |

| B2  | G12 |
|-----|-----|
| G22 | R2  |

FIG.6D

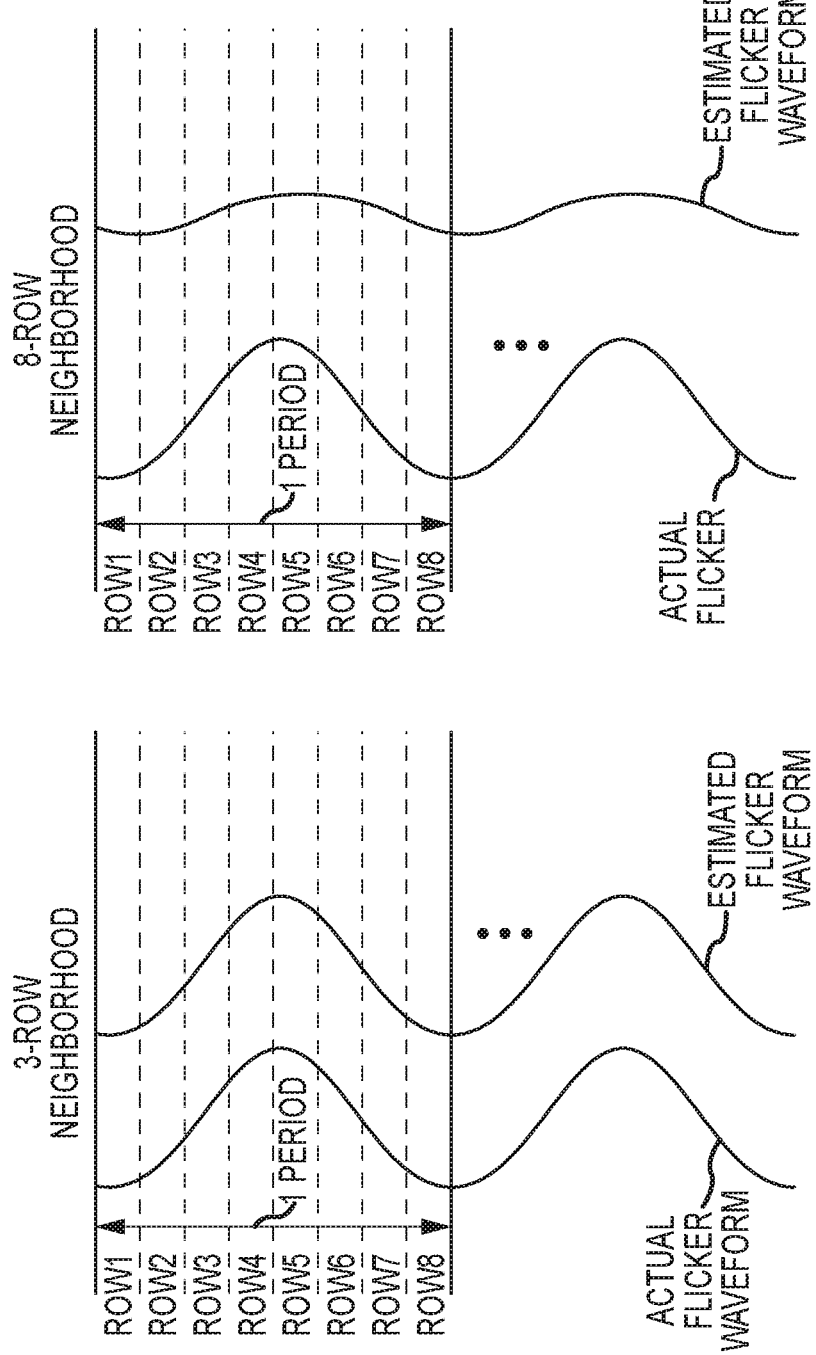

METHODS AND APPARATUS FOR REDUCING SPATIAL FLICKER ARTIFACTS

CROSS-REFERENCE TO RELATED APPLICATION

This application is a continuation of U.S. patent application Ser. No. 15/191,260, filed on Jun. 23, 2016, and incorporates the disclosure of the application in its entirely by reference.

BACKGROUND OF THE TECHNOLOGY

In multiple exposure high dynamic range (ME-HDR) imaging, an image sensor captures multiple image frames with different integration times, where the integration times have fixed ratios between them. The frames are then combined together to produce a high dynamic range (HDR) image. The integration times in most image sensors are controlled by an electronic rolling shutter (ERS). Capturing images with an ERS-based image sensor may produce a spatial flicker when a scene is illuminated by alternating current (AC) sources. The spatial flicker typically appears as intensity variations or 'bands' across the image (i.e. spatial artifacts).

The number of bands may be affected by the AC source frequency and the exposure time. The amplitude of the intensity variation is dependent on the waveform driving the scene illumination. The flicker can also vary across different color channels depending on the type of illumination. In ME-HDR, all of these factors result in frames exhibiting spatial flicker with phase differences and amplitude variations between multiple frames. When the frames are combined together, color artifacts may be observed in the HDR image in addition to the intensity bands.

A conventional method for avoiding flicker is to adjust the integration time to be an integer multiple of half the flicker period. This technique can eliminate flicker for the longest-exposure image (T1). Adjusting the integration time for the shorter-exposure images (T2, T3 . . . TN) while simultaneously maintaining the necessary integration ratios between them, however, does not produce flicker-free images, since the shorter integration times are almost always less than one flicker period.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figure 2:
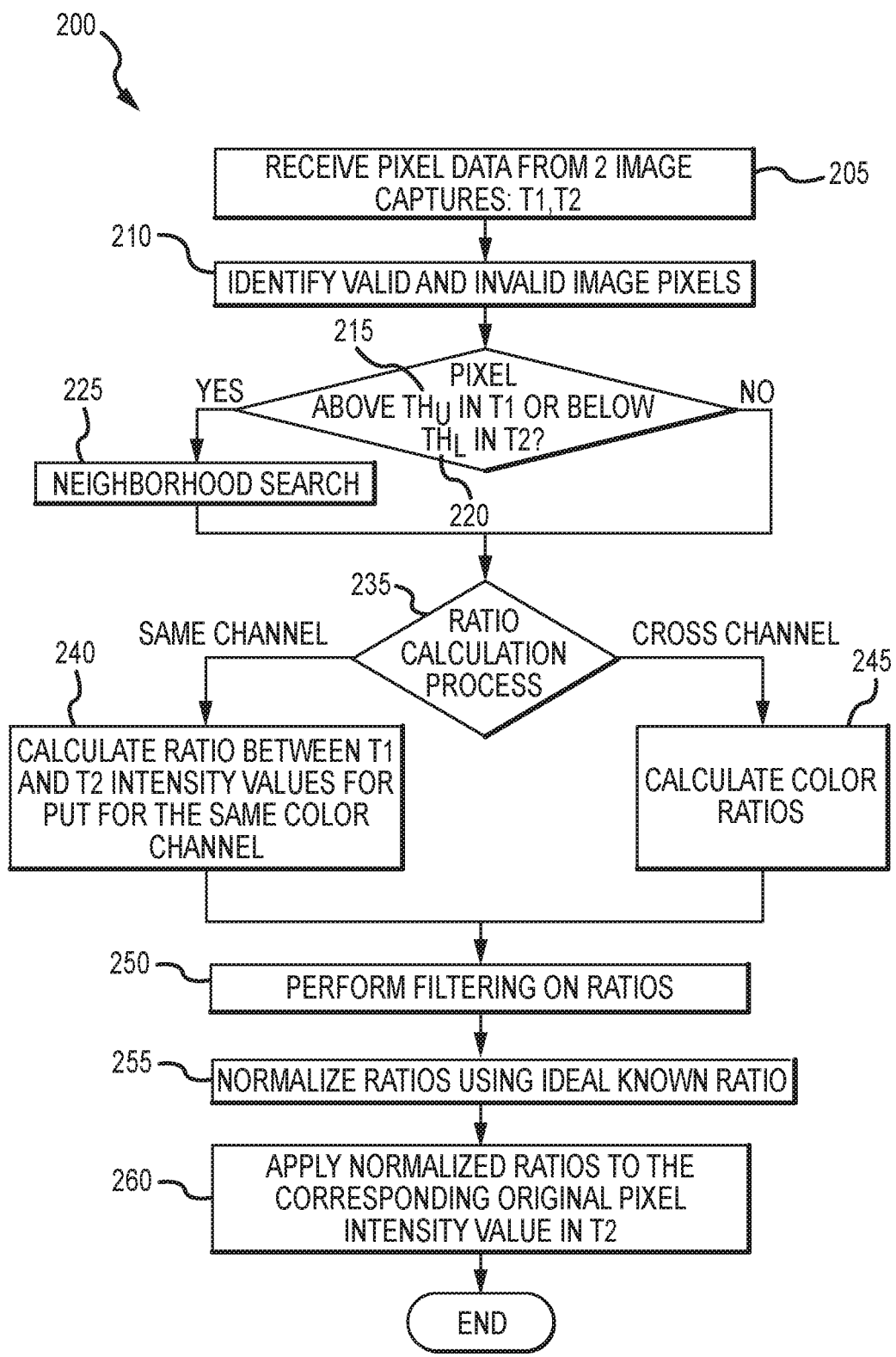
Figure 3:
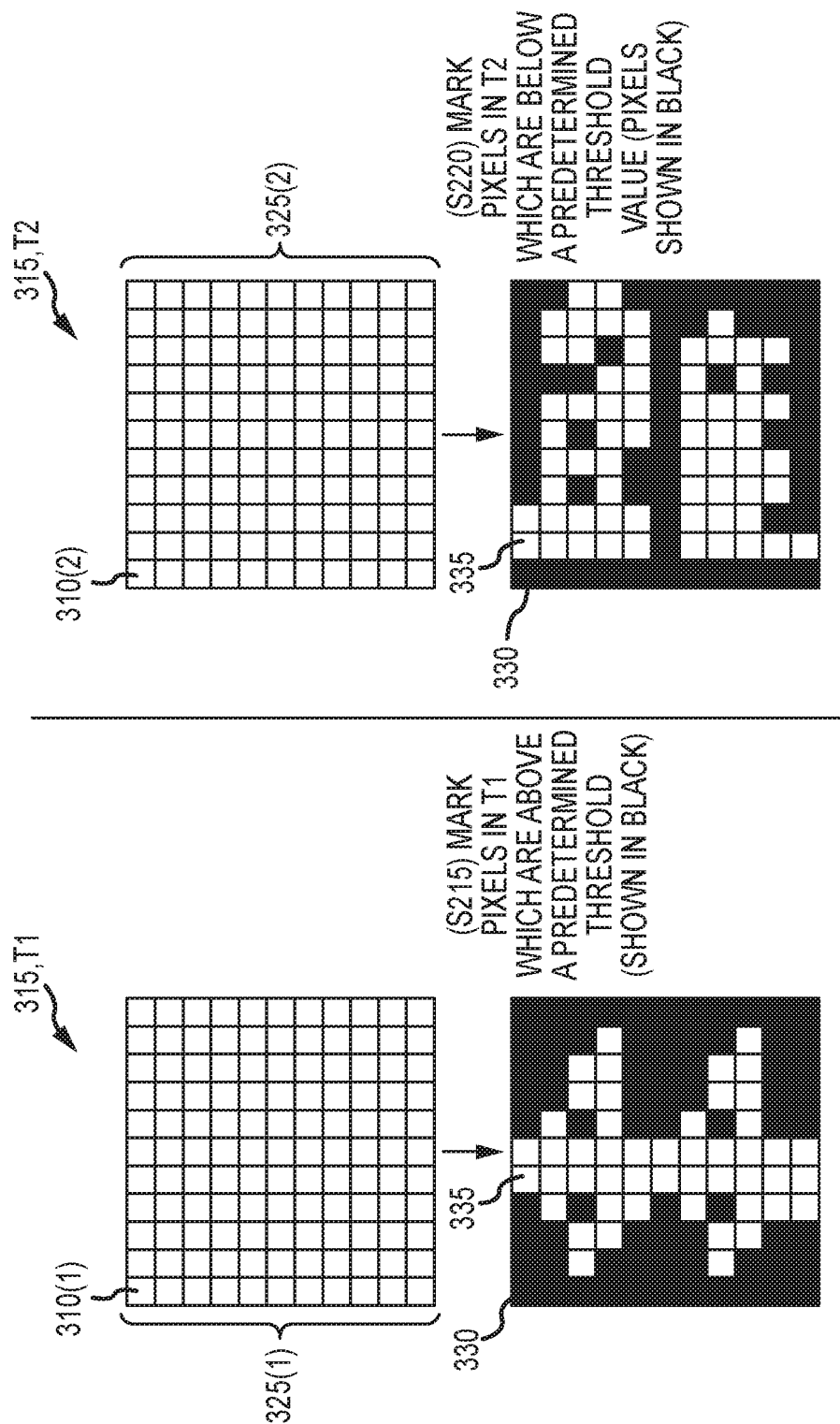
Figure 4:
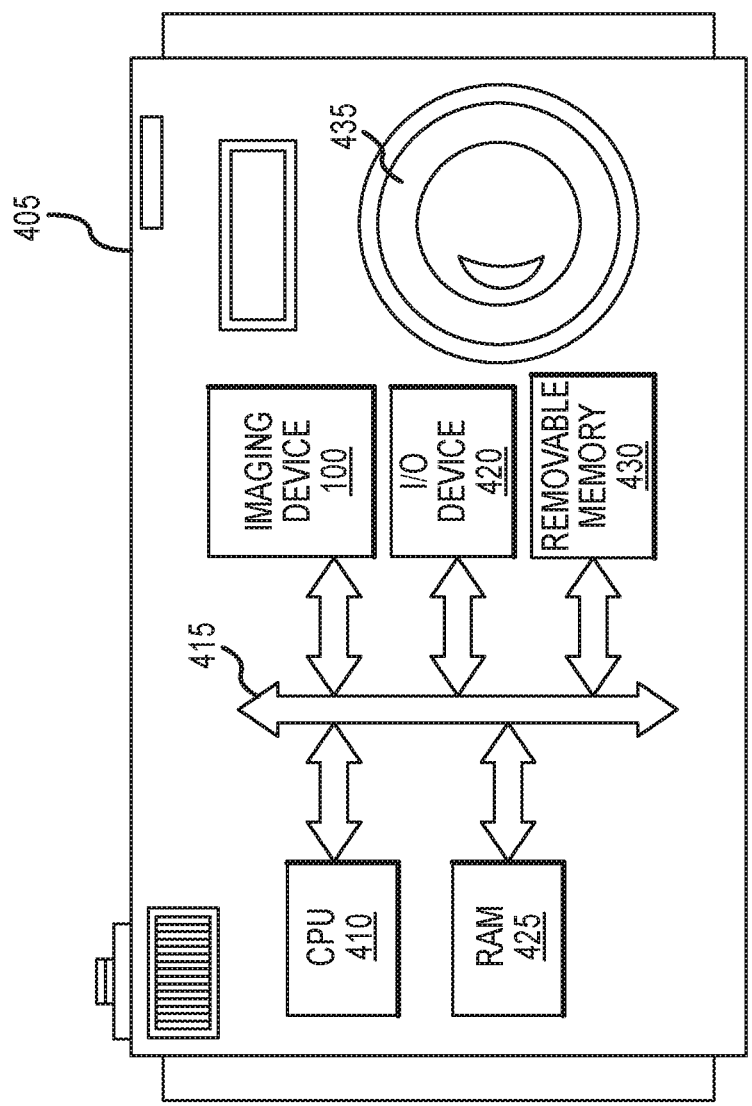
Figure 5:
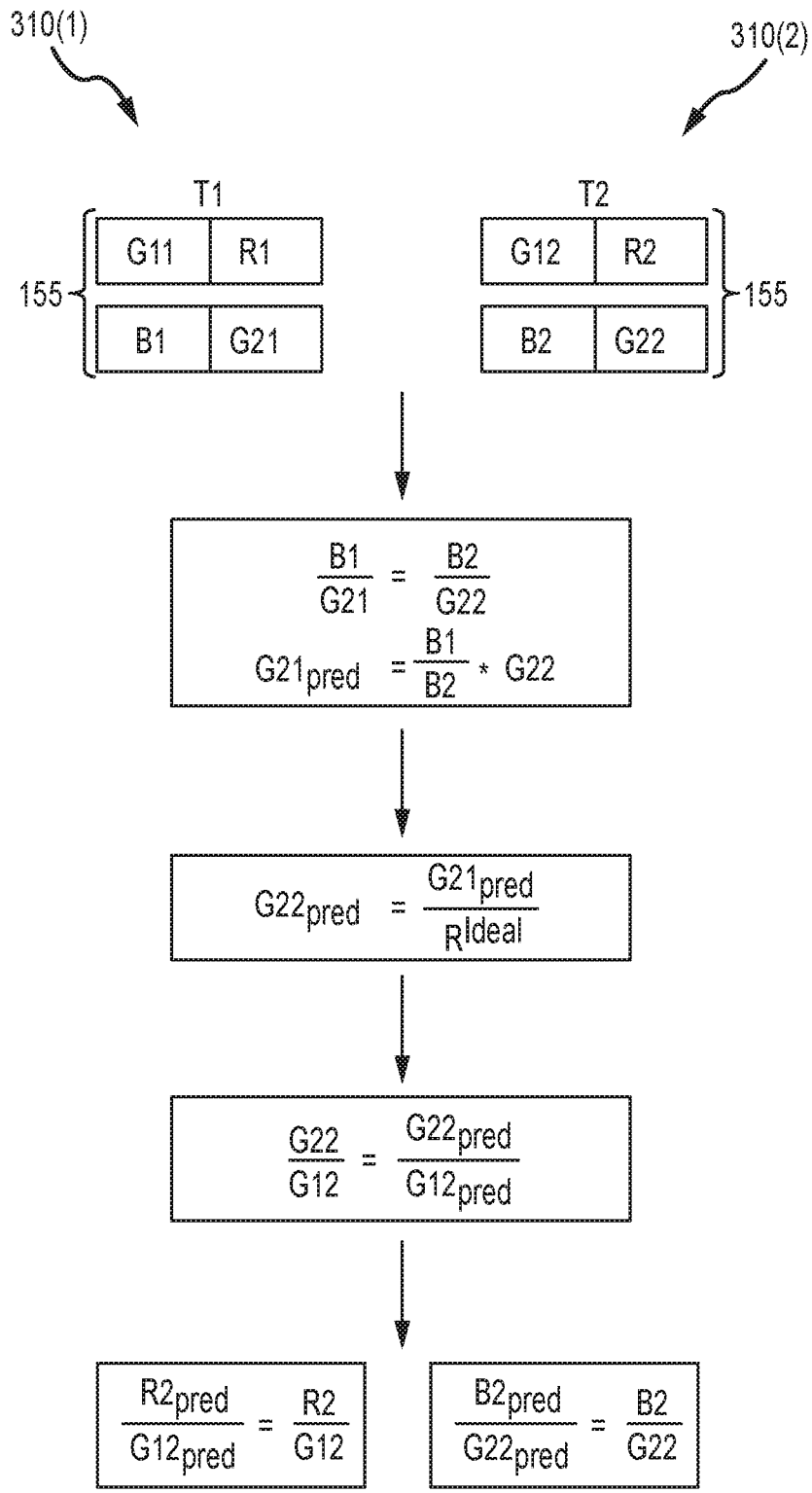
Figure 7A:
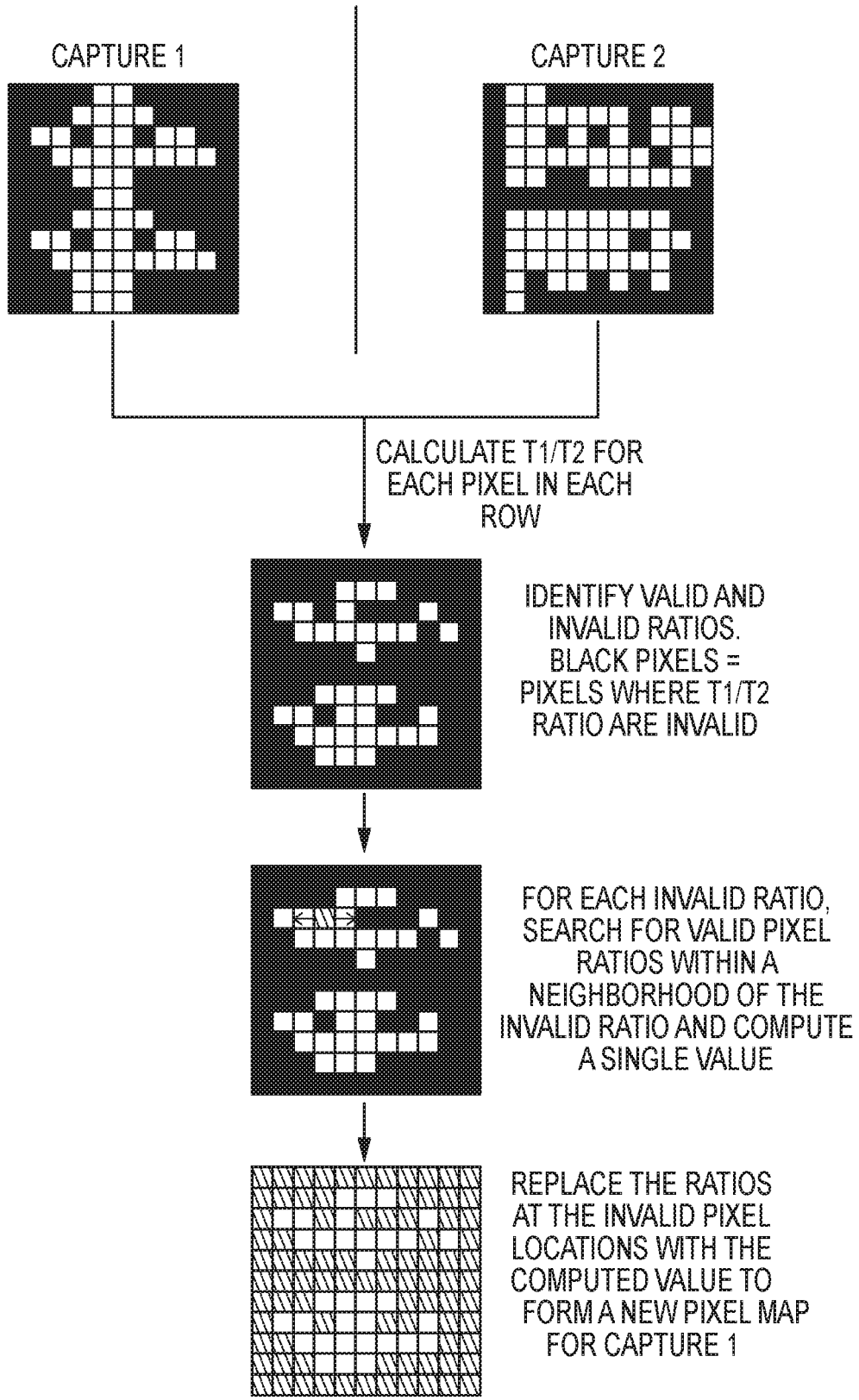
Figure 7B:
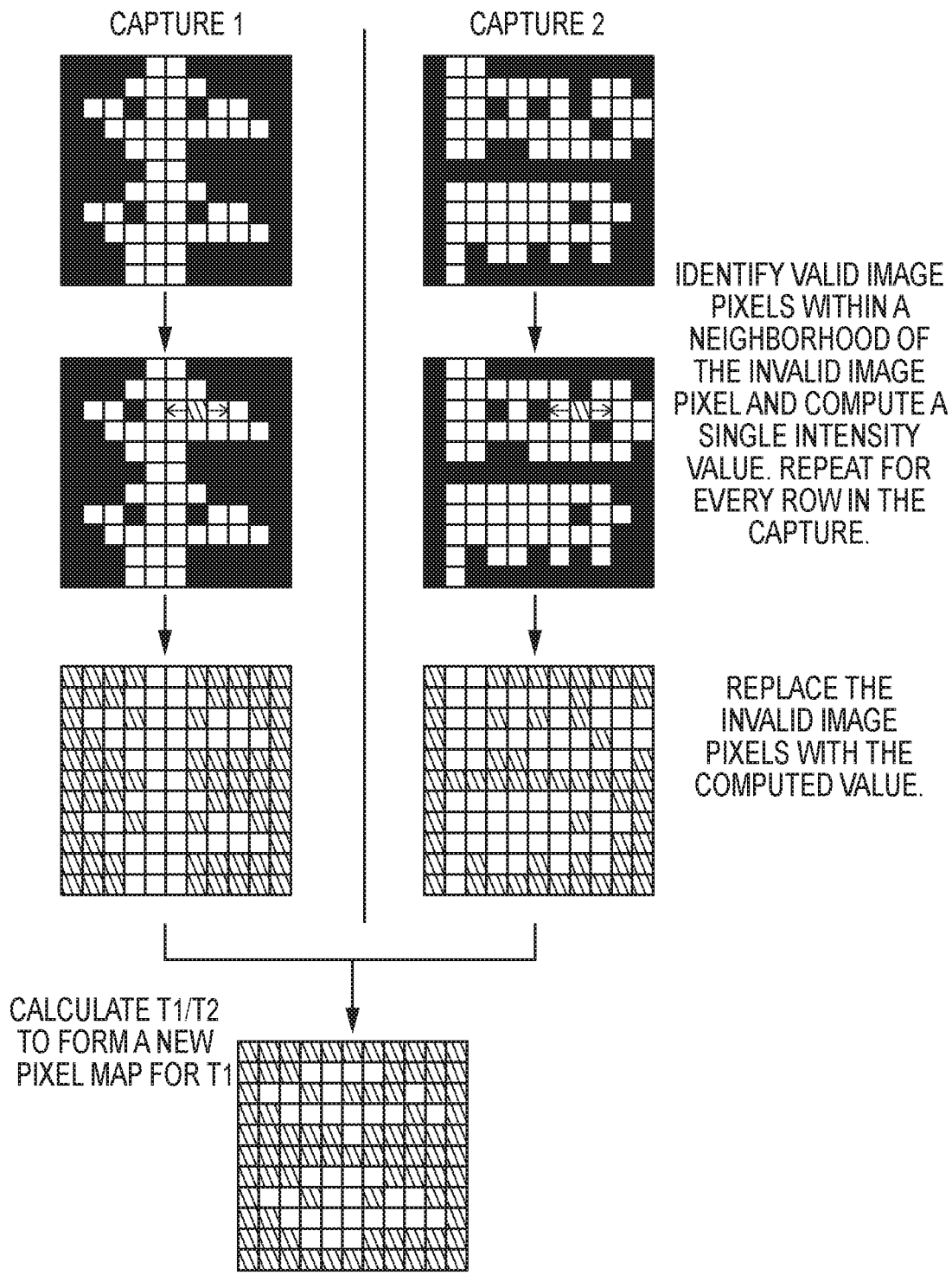
Figure 8:
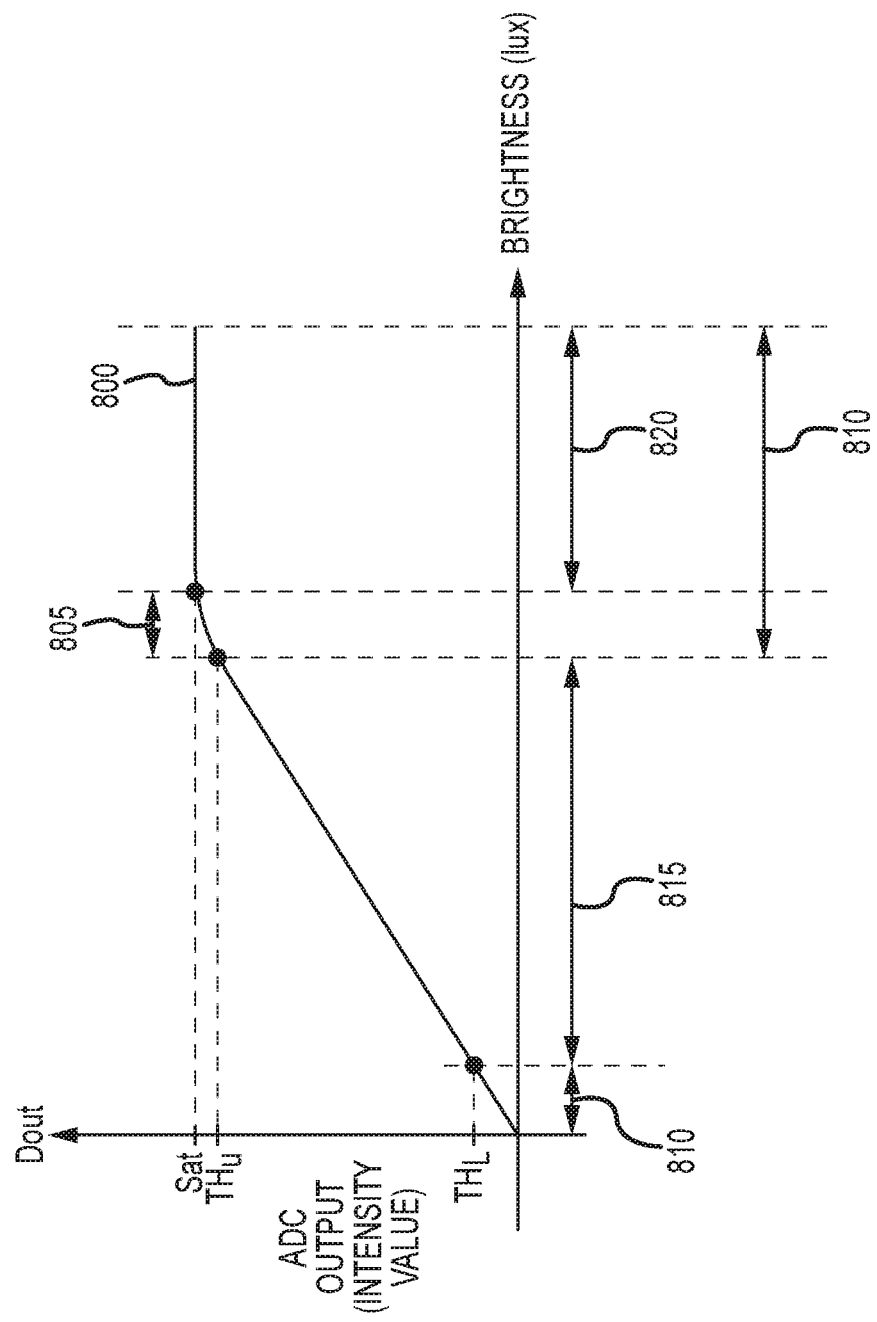

FIG. 1 representatively illustrates a block diagram of an imaging device in accordance with an exemplary embodiment of the present technology;

FIG. 2 representatively illustrates a process for reducing spatial artifacts in accordance with an exemplary embodiment of the present technology, FIG. 3 representatively illustrates a diagram of part of a process for reducing spatial artifacts in accordance with an exemplary embodiment of the present technology;

FIG. 4 representatively illustrates an imaging system in accordance with an exemplary embodiment of the present technology;

FIG. 5 representatively illustrates a process in accordance with an exemplary embodiment of the present technology;

FIGS. 6A-D representatively illustrate alternative arrangements of a color filter array in accordance with an exemplary embodiment of the present technology;

FIGS. 7A-B representatively illustrate neighborhood searches in accordance with exemplary embodiments of the present technology;

FIG. 8 representatively illustrates a graph in accordance with an exemplary embodiment of the present technology; and FIGS. 9A-B representatively illustrate waveforms and estimated waveforms in accordance with exemplary embodiments of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various semiconductor devices, circuitry, sensors, image signal processors, and the like, which may carry out a variety of functions. In addition, the present technology may be practiced in conjunction with any number of imaging systems, and the system described is merely one exemplary application for the technology.

Methods and apparatus for reducing spatial flicker artifacts according to various aspects of the present technology may operate in conjunction with any suitable imaging system, such as a computer system, camera system, machine vision system, vehicle navigation system, video telephone, surveillance system, auto focus system, motion detection system, image stabilization system, smartphone, and the like.

Referring to FIGS. 1 and 4, an exemplary imaging system may comprise an electronic device, in this case a digital camera 405. The system may comprise a central processing unit (CPU) 410 that communicates with various devices over a bus 415.

An input/output (I/O) device 420 may be connected to the bus 415 and may, in some embodiments, provide communication into and out of the digital camera 405 or other system. For example, the I/O device 420 may comprise a port to facilitate communication with an external device, such as a computer display, memory card, or some other external unit. The I/O device 420 port may transfer digital image data, such as video data, image data, frame data, and/or gain information, for example from an image signal processor 145. In other embodiments, the I/O device 420 may comprise an internal device, such as a display screen or a memory component, for directly viewing and/or storing the digital image data.

Other devices connected to the bus 415 may provide memory, for example, a random access memory (RAM) 425, hard drive, and/or one or more peripheral memory devices 430, such as a floppy disk drive, compact disk (CD) drive, USB drive, memory card, and SD card. While the bus 415 is illustrated as a single bus, any number of busses or other connections may be used to provide communication paths to interconnect the elements.

In various embodiments, the electronic device may further comprise a lens 435 configured to focus an image on a pixel array 105. For example, the lens 435 may include a fixed and/or adjustable lens and may include micro lenses formed on an imaging surface of an imaging device 100.

The imaging device 100 (also referred to as an "image sensor") captures and generates image data. The imaging device 100 may be combined with a processor, such as the CPU 410, a digital signal processor, or a microprocessor, in a single integrated circuit, or may be on a separate chip. The imaging device 100 may also receive control or other signals from the system, such as a shutter release. In the present embodiment, the imaging device 100 may comprise a CMOS imager.

Referring to FIG. 1, in an exemplary embodiment of the present technology, the imaging device 100 may comprise a plurality of pixels 110 arranged in rows and columns to form a pixel array 105. In an exemplary embodiment, each pixel 110 comprises a photodetector, such as a photodiode, for capturing light and converting light into an electric signal.

A color filter system, such as a color filter array (CFA) 155 comprising a pattern of color filters, may be situated on the pixel array 105 to capture color information. In the exemplary embodiment, each pixel 110 is covered with one color of the CFA 155. For example, a Bayer color filter array comprising a pattern of red R, blue B, and green G filters may be provided. In other embodiments, the CFA 155 may be formed using other color filters, such as a CYYM filter (one cyan, two yellow, and one magenta), a CYGM filter (one cyan, one yellow, one green, and one magenta), a CRGB filter (one cyan, one red, one green, and one blue), and any other suitable color pattern. In various embodiments, the CFA 155 may comprise "clear" or transparent filter elements. The CFA 155 may form a 2×2 color pattern, a 4×4 color pattern, a 2×4 color pattern, or any other suitable pattern size. In various embodiments, the CFA 155 may repeat to cover the entire pixel array 105.

The imaging device 100 may capture and generate image data corresponding to one or more rows in the pixel array 105. The image data may comprise image pixel data corresponding to one or more pixels 110 in the pixel array 105. Once a scene, or part of a scene, is captured by the imaging device 100, the resulting capture may be represented as an image capture 315 (FIG. 3). Each image capture 315 may comprise image pixels 310 which correspond to the pixels 110 in the pixel array 105.

In an exemplary embodiment, the image pixels 310 may comprise image pixel data. The image pixel data may comprise information representing a measured voltage, current, or other quantity as a result of light absorbed by the pixel 110 (i.e., an intensity value), such that each image pixel 310 comprises an individual pixel intensity value. The intensity value may be a digital value. The image pixel data may also comprise row and column information corresponding to each pixel 110 in the pixel array 105.

The image data may be captured and generated with differing integration (i.e., exposure) times. In an M-image capture system, where M is the total number of image captures, each capture may have a different integration time, and each image capture may be generally referred to as TN, where N=1, 2, 3, . . . M. For example, a 4-image capture system has a first capture T1 with a first integration time, a second capture T2 with a second integration time, a third capture T3 with a third integration time, and a fourth capture T4 with a fourth integration time T4. Likewise, a 2-image capture system has a first capture T1 with a first integration time and a second capture T2 with a second integration time. In an exemplary embodiment, the image capture with the first integration time T1 may be the longest, with the second, third, . . . M-captures having an integration time which is some fraction of the first integration time. In various embodiments, the image captures T1:TM may be obtained consecutively and within a short time span, wherein each image capture T1:TM may produce a single frame.

In various embodiments, the imaging device 100 may further comprise row circuitry 115, column circuitry 120, and a timing and control unit 125, for selectively activating sequential rows of pixels to be read out to a sample-and-hold circuitry 130. The pixel signal may be then be transmitted to an amplifier 135 to amplify the signal prior to being converted to a digital signal by an analog to digital converter 140. The digital pixel data may then be transmitted to and stored in the image signal processor 145 for further processing.

In an exemplary embodiment, the pixel data may be stored utilizing line buffers (not shown) to temporarily store a portion of the pixel data, such as 3 lines of pixel data. In an alternative embodiment, the pixel data may be stored utilizing a frame buffer (not shown) to store an entire frame of pixel data.

In an exemplary embodiment, the imaging device 100 may comprise a switch (not shown) configured to selectively enable one of a first circuit to perform a first ratio calculation (e.g., same-color channel ratio) or a second circuit to perform a second ratio calculation (e.g., cross-color channel ratio), described below. The switch may be manually or automatically operated. For example, the switch may be implemented using any suitable device, such as a transistor, or an external toggle switch for operation by a user.

The imaging device 100 may further comprise the image signal processor 145 to perform demosaicing and/or other functions, such as autofocus, exposure, noise reduction, and white balance. The image signal processor 145 may comprise any number of semiconductor devices, such as transistors, capacitors, and the like, for performing calculations, transmitting and receiving image pixel data, and a storage unit for storing image pixel data. In various embodiments, the image signal processor 145 may be implemented with a programmable logic device, such as a field programmable gate array (FPGA) or any other device with reconfigurable digital circuits. In other embodiments, the image signal processor 145 may be implemented in hardware using non-programmable devices. In alternative embodiments, the image signal processor 145 may be formed partially or entirely within an integrated circuit in silicon using any suitable complementary metal-oxide semiconductor (CMOS) techniques or fabrication processes, in an ASIC (application-specific integrated circuit), using a processor and memory system, or using another suitable implementation.

In an exemplary embodiment, the image signal processor 145 may store image pixel data from one or more image captures 315 having different integration times. For example, in a 2-image capture system, image pixel data from one or more rows of the first capture may be stored along with one or more corresponding (i.e., same spatial location) rows of the second capture. In other embodiments, for example in a 4-image capture system, the image signal processor 145 may receive image pixel data from more than two image captures 315, such that corresponding portions of the image pixel data from four captures T1 through T4, each capture with differing integration times, may be processed at any given time. Image pixel data may be defined as corresponding if the image pixel data from one image capture 315 is derived from the same spatially located pixel 110 as the image pixel data from a different image capture 315 taken at a different time, for example image pixel data from rows 1:5 of the first capture and image pixel data from rows 1:5 of the second capture, wherein the second capture is obtained later in time than the first capture. In alternative embodiments, image pixel data from an entire pixel array 105 may be received and stored at a given time.

Referring now to FIGS. 2 and 3, in an exemplary embodiment, the 2-image capture system may comprise a first capture T1 having a first integration time, and a second capture T2 having a second integration time. In an exemplary embodiment, the first integration time is longer than the second integration time. In various embodiments, each image capture T1, T2 may be realized by utilizing an electronic rolling shutter (not shown) wherein reset, integration and readout operate in a row-by-row manner starting with a first row of the pixel array 105.

In the 2-image capture system, the image signal processor 145 (FIG. 1) may perform a process 200 for reducing spatial artifacts, including receiving pixel data from at least two captures (205), wherein the first capture T1 has a first integration time, and the second capture T2 has a second integration time, identifying valid and invalid image pixels (210), for example by determining the intensity value for each image pixel 310, and then determining whether the intensity value falls above or below predetermined thresholds (215), (220).

Referring now to FIG. 8, each image pixel 310 may be described using a transfer function 800. The transfer function 800 illustrates an analog pixel signal (measuring the brightness level in lux) versus a digital output of the ADC (i.e., intensity value). The analog pixel signal may be converted to a digital value using various quantization levels.

The image pixels 310 may be defined as either "valid" 815 or "invalid" 810, for example based on whether or not the intensity value falls above or below predetermined thresholds. The valid and invalid pixels may be defined according to any suitable criteria. In the present exemplary embodiment, valid pixels correspond to actual brightness conditions, while invalid pixels do not. For example, image pixel data may not reflect actual brightness conditions when the sensor pixel is saturated or when the brightness is below the sensor pixel's capability to reliably measure the brightness. The valid/invalid criteria may also or alternatively be based on the resolution of the ADC 140 or other suitable criteria.

In one embodiment, "valid" 815 image pixels may be defined as those image pixels with intensity values between a lower threshold $TH_L$ and an upper threshold $TH_U$. "Invalid" 810 image pixels 310 may be defined as those image pixels 310 with intensity values less than or equal to the lower threshold $TH_L$, and those image pixels with intensity values greater than or equal to the upper threshold $TH_U$. The upper and lower threshold value $TH_L$, $TH_U$ may be predetermined based on the resolution of the ADC 140 (FIG. 1) being utilized.

For example, a 12-bit ADC may have a lower threshold value set at 32 and an upper threshold value set at 3500. In various embodiments, as the resolution of the ADC 140 increases, the upper threshold $TH_U$ value may also increase. In various embodiments, the lower threshold $TH_L$ may be tuned within a small percentage of the full intensity range, based on the noise characteristics of the sensor. In various embodiments, the upper threshold $TH_U$ value may be less than a saturation value SAT and may be selected such that the value does not fall within the non-linear region 805 of the pixel signal. A pixel with an intensity value which exceeds the maximum resolution of the ADC 140 may be defined as "saturated" 820. For example, in a 12-bit ADC system, the saturation point is 4095. In various embodiments, saturated pixels are "invalid."

Referring back to FIGS. 2 and 3, in the 2-image capture system, the imaging device 100 produces the first capture T1 and the second capture T2, wherein each capture T1, T2 comprises an array 325(1), 325(2) of image pixels 310. As described above, each image pixel 310 comprises image pixel data corresponding to the intensity value of the exposed pixel 110 and thus the corresponding image pixel 310. As such, the image signal processor 145 may define each image pixel 310 as valid or invalid according to its intensity value.

For example, the image pixel 310(1) from the first capture T1 with an intensity value above a first predetermined threshold (e.g., the upper threshold $TH_U$) may be defined as an invalid image pixel 330(1), and the image pixel with an intensity value at or below the first predetermined threshold may be defined as a valid image pixel 335(1) (S215). Similarly, the image pixel 310 from the second capture T2 with an intensity value below a second predetermined threshold (e.g., the lower threshold $TH_L$) may be defined as an invalid image pixel 330(2), (S220) and the image pixel 310(2) with an intensity value at or above the second predetermined threshold may be defined as a valid image pixel 335(2). In other embodiments, such as those having more than two image captures 315, the image signal processor 145 may identify and define each of the resulting image pixels 310 formed from the additional image captures 315 according to their intensity value as described above. Referring to FIG. 3, the valid image pixels 335 are illustrated as white image pixels and the invalid image pixels 330 are illustrated as black image pixels.

In various embodiments, if the image signal processor 145 identifies invalid image pixels 330, the image signal processor 145 may modify, by removing and replacing, those invalid image pixels 330. In the current embodiment, if the image captures T1, T2 comprise invalid image pixels 330, then a neighborhood search 225 for the nearest valid image pixels 335 may be performed.

The image signal processor 145 may perform the neighborhood search 225 comprising detecting valid image pixels 335 within a neighborhood of the invalid image pixel 330. The neighborhood of the invalid image pixel 330 may be defined in any suitable manner, such as image pixels in the same row or column or within a particular range of the invalid image pixel. In the present embodiment, neighborhood image pixels are defined as those pixels sharing the same row as the invalid image pixel 330. For example, the image signal processor 145 may detect the valid image pixels 335 to the left and to the right of the invalid image pixel 330.

The neighborhood of the invalid pixel 330 may also be defined as the image pixels 310 in a predetermined number of rows above and/or below the invalid pixel 330. In various embodiments, the total number of rows defining the neighborhood may be selected such that averaging the intensity ratios for those selected rows produces an accurate representation of a flicker waveform. For example, the image signal processor 145 may detect the valid pixels 335 in two (2) rows above and two (2) rows below the row with the invalid image pixel 330, for a total of five (5) rows. In other embodiments, a total of three (3) rows may define the neighborhood (one row above and one row below the row of interest).

In various embodiments, the image signal processor 145 may compute a maximum number of total rows to define the neighborhood. The following equations produce an estimated flicker waveform as a function of the row number, and may be used to determine the maximum number of rows that may be used to define the neighborhood.

$$r_1(i) = m t_{s1} + A_1 \cos(\omega i + \theta_1) \quad \text{(equation 1)}$$

$$r_2(t) = m t_{s2} + A_2 \cos(\omega i + \theta_2) \quad \text{(equation 2)}$$

Where, i=row number; a=flicker amplitude; m=flicker mean; $t_{flicker}$=flicker period; $t_r$=row time; $t_f$=frame time; n=frame number; $t_{e1}$=T1 integration time; $t_{e2}$=T2 integration time; $r_1(i)$=T1 flicker at row i; $r_2(i)$=T2 flicker at row i;

$$A_1 = \frac{a t_{flicker}}{\pi} \sin \frac{t_{e1} \pi}{t_{flicker}};$$

$$A_2 = \frac{a t_{flicker}}{\pi} \sin \frac{t_{e2} \pi}{t_{flicker}};$$

$$\omega = \frac{2\pi t_r}{t_{flicker}};$$

$$\theta_1 = \frac{2 n t_{frame} \pi}{t_{flicker}} + \frac{\pi t_{e1}}{t_{flicker}}; \text{ and}$$

$$\theta_2 = \frac{2 n t_{frame} \pi}{t_{flicker}} + \frac{\pi t_{e1}}{t_{flicker}} + \frac{\pi t_{e2}}{t_{flicker}}.$$

In various embodiments, the flicker period $t_{flicker}$ may calculated based on the frequency of the alternating current supply. For example, in some countries, the frequency is 50 Hz, while in other countries the frequency is 60 Hz.

In general, the maximum number of rows that may be used to define a neighborhood equals the number of rows corresponding to one flicker period according to the equations 1 and 2 above. For example, if there are 10 rows per flicker period, then the maximum number of rows that may be used to define a neighborhood will be 10 rows, although the maximum number may not be an ideal number due to hardware constraints, such as an increase in the number of line buffers.

The graphs in FIGS. 9A-B illustrate that as the total number of rows used to define the neighborhood increases, the less accurate the estimated flicker waveform will be. FIG. 9A illustrates a 3-row neighborhood, where the estimated flicker waveform is substantially similar to and representative of the actual flicker waveform. Conversely, FIG. 9B illustrates an 8 row-neighborhood, where the estimated flicker waveform does not accurately represent the actual flicker waveform.

The image signal processor 145 may, during the neighborhood search 225, compute a single representative value based on the neighboring valid image pixels 335. For example, the representative value may be a computed average (i.e., arithmetic mean) of the neighboring valid image pixels 335. In other embodiments, the representative value may be a median, a mode, a geometric mean, or any other computation suitable for obtaining a single value. In an exemplary embodiment, the representative value may be used to modify and/or replace the invalid image pixel 330.

Referring now to FIGS. 7A-B, the image signal processor 145 may perform the neighborhood search any number of ways. FIG. 7A illustrates one exemplary embodiment of the neighborhood search in a 2-image capture case, wherein the intensity value for each of the image pixels from the first and second captures T1, T2 is identified as valid or invalid. An intensity ratio may be calculated, for example by dividing the intensity value for each image pixel from the first capture T1 with the intensity value of the same spatially located image pixel from second capture T2. The intensity ratio is then identified as valid or invalid using the same threshold criteria described above. For each invalid image pixel, the neighborhood of the invalid image pixel is searched to find valid intensity ratios. Once valid intensity ratios are identified, the representative value may be computed. The representative value may then be used to modify and/or replace the invalid image pixels to form a new first pixel map for capture 1.

FIG. 7B illustrates another exemplary embodiment of the neighborhood search in a 2-image capture case, wherein the intensity value for each of the image pixels from the first and second captures is identified as valid or invalid. For each capture, the neighborhood search is performed to locate the image pixels with valid intensity values for each invalid intensity value. Once the valid image pixels are identified, the representative value may be computed. The representative value may be used to modify and/or replace the invalid image pixels 330 to form a corrected first and second pixel maps for captures 1 and 2 respectively. A new pixel map is then formed by dividing the image pixel intensity values of each of the corrected first pixel map by the same spatially located image pixels of the corrected second pixel map. The new pixel map may then be used to determine the predicted values described below.

In various embodiments, then the image signal processor 145 may perform a ratio calculation 235 to compute a "predicted" value. A priori knowledge of the fixed integration time ratios between the integration times may be utilized to compute the "predicted" value for a particular color channel. For example, if there is no motion in the scene, the integration time ratios remain unchanged between the image captures 315 and a flicker-free value can be obtained by calculating the gain necessary to nullify the effect of flicker. As such, the "predicted" value will be flicker-free, and since the invalid image pixels 330 are modified, for example removed and replaced, with valid image pixels 335, the "predicted" value will also be valid.

In various embodiments, the image signal processor 145 may perform the ratio calculation 235 utilizing valid image pixel values, where the valid image pixel values may be the computed values for the new pixel map generated during the neighborhood search (225) and/or the original image pixel values. The ratio calculation 235 may be between two image captures 315 for the same color channel (240) (i.e., same-color channel). For example, in the 2-image capture system, since the first capture T1 and the second capture T2 have the same spatially located image pixels 310, they also have corresponding color channels. Therefore, the ratio calculation 235 may be performed by dividing the pixel intensity value of the color channel of first capture T1 with the corresponding pixel intensity value of the same color channel of the second capture T2. For example, referring to FIG. 5, the CFA 155 with the Bayer color pattern may form the following same-color channel ratios: R1/R2, B1/B2, G11/G12 and G21/G22. In other embodiments, utilizing a CFA 155 other than a Bayer color pattern, same-color channel ratios may be formed based on the colors of the CFA 155 being used.

Alternatively, the image signal processor 145 may perform the ratio calculation (235) between differing color channels within the same image (245) (i.e. cross-color channel). For example, the image signal processor 145 may perform ratio calculation (235) between differing color channels within the first capture T1 (e.g. B1/G21 as shown in FIG. 5 using a Bayer color pattern), or between differing color channels within the second capture T2 (e.g. B2/G22 as shown in FIG. 5 using a Bayer color pattern).

In various embodiments, where invalid image pixels are identified and the neighborhood search is performed to identify the valid image pixels to create the new corrected image pixel map, the new corrected image pixel map is used by the image signal processor 145, in place of the original first image capture T1, to perform either the same-channel ratio calculation or the cross-channel ratio calculation.

Referring now to FIGS. 6A-D, the image signal processor 145 may perform ratio calculation (235) on alternative CFA 155 configurations in the same manner described above. While the CFA 155 shown in FIGS. 6A-D illustrate various configurations using the Bayer colors (i.e. red, green, and blue), it should be understood that any CFA 155 may be manipulated to form various color patterns.

In various embodiments, manual or automatic selection, via the switch, between the same-color channel ratio calculation (240) and the cross-color channel ratio calculation (245) may be based on the presence of a particular light source. Some light sources, such as florescent light, may produce variations between different color channels, such that the flicker amplitude and mean for one color channel may differ from that of another color channel. In this case, the same-color channel ratio calculation (240) may be selected and performed because a calculated gain in one color channel may not be the correct value for minimizing the flicker in another color channel.

In various embodiments, the image signal processor 145 may perform filtering on the gain ratios (250) to remove unwanted noise in the signals. Filtering (250) may comprise utilizing any suitable filter to achieve a desired result. For example, filtering (250) may comprise a median filter, averaging filter, infinite impulse response filters, or any combination thereof. In various embodiments, the number of rows in a kernel may be selected by design so that the spatial extent of a single flicker period is not exceeded. In an exemplary embodiment, the gain ratios are filtered, rather than the actual pixel data.

The image signal processor 145 may normalize the calculated ratios utilizing a known ideal ratio $R_{ideal}$ (255). In various embodiments, the image signal processor 145 may normalize the calculated ratio (255) for both same-color channel ratios and cross-color channel ratios.

A general expression for cross-channel normalization and prediction may be summarized in the following equations:

$$\frac{V1_{icc}}{V1'_{cc}} = \frac{V2_{icc}}{V2_{cc}}$$

Therefore, $$V1'_{cc} = \frac{V1_{icc}}{V2_{icc}} \times V2_{cc}$$

Now, $$V2'_{cc} = \frac{V1'_{cc}}{R_{ideal}}$$

Hence, $$V2'_{cc} = V2_{cc} \times \frac{\frac{V1_{icc}}{V2_{icc}}}{R_{ideal}}$$

Where, $V1'_{cc}$=The predicted intensity value of the color channel that is under consideration in the first capture T1;

$V2'_{cc}$=The predicted intensity value of the color channel that is under consideration in the second capture T2;

$V2_{cc}$=The original intensity value of the color channel that is under consideration in the second capture T2;

$V1_{icc}$=The original intensity value of the color channel that is being used as the basis for the prediction in the first capture T1;

$V2_{icc}$=The original intensity value of the color channel that is being used as the basis for the prediction in the second capture T2; and $R_{ideal}$=The ideal known ratio between the integration times for the first and second captures T1, T2.

Consider the following example, utilizing a CFA 155 with a Bayer color pattern, as illustrated in FIG. 5.

Let $V1'_{cc}$=G21' i.e. the predicted intensity value of the Green channel on the Green-Blue row in the first capture T1;

$V2'_{cc}$=G22' i.e. the predicted intensity value of the Green channel on the Green-Blue row in the second capture T2;

$V2_{cc}$=G22 i.e. the original intensity value of the Green channel on the Green-Blue row in the second capture T2;

$V1_{icc}$=B1, i.e. the original intensity value of the Blue channel that is being used as the basis for the prediction in the first capture T1;

$V2_{icc}$=B2, i.e. the original intensity value of the Blue channel that is being used as the basis for the prediction in the second capture T2; and $R_{ideal}$=The ideal known ratio between the integration times for the first and second capture T2.

$$\frac{B1}{G21'} = \frac{B2}{G22}$$

$$G21' = \frac{B1}{B2} \times G22$$

$$G22' = \frac{G21'}{R_{ideal}}$$

$$G22' = G22 \times \frac{\frac{B1}{B2}}{R_{ideal}}$$

Predicted values for the remaining channels may be obtained in the same way.

A general expression for same-channel normalization and prediction is described below:

$$V2'_{cc} = V2_{cc} \times \frac{\frac{V1_{icc}}{V2_{cc}}}{R_{ideal}}$$

Where, $V2'_{sc}$=The predicted intensity value of the color channel that is under consideration in the second capture T2;

$V2_{sc}$ The original intensity value of the color channel that is under consideration in the second capture T2;

$V1_{sc}$=The original intensity value of the same color channel that is under consideration in the first capture T1; and $R_{ideal}$=The ideal known ratio between the integration times for the first and second image captures T1, T2.

Consider the following example utilizing a CFA 155 with a Bayer color pattern, as illustrated in FIG. 5.

Let $V2'_{sc}$=G22' i.e., the predicted intensity value of the Green channel on the Green-Blue row in the second capture T2;

$V2_{sc}$=G22 i.e. the original intensity value of the Green channel on the Green-Blue row in the second capture T2;

$V1_{sc}$=G21 i.e. the original intensity value of the Green channel on the Green-Blue row in the first capture T1; and $R_{ideal}$=The ideal known ratio between the integration times for the first and second image captures T1, T2.

Therefore, $$G22' = G22 \times \frac{\frac{G21}{G22}}{R_{ideal}}$$

Predicted values for the remaining channels may be obtained in the same way.

In various embodiments, the intensity values of the image pixels 310 selected from each of the first and second captures T1, T2 may share the same spatially located pixel 110.

In various embodiments, the predicted intensity values may be used to modify and/or replace the intensity values of the corresponding image pixels 310 in the second capture T2 (260) to form a new flicker-free image.

In various embodiments where more than two image captures 315 are desired, the same process 200 described above may be applied to subsequent image captures 315. For example, in a case comprising four image captures T1, T2, T3, T4, each with differing integration times, the first two image captures T1, T2 be processed according to the process described above. The subsequent image captures (e.g. image captures three and four T3, T4) may be cascaded with the first and second image captures T1, T2. For example, in a cross-color channel case, the ratio calculations formed to obtain a new flicker-free third image, may be made between the first capture and third captures T1, T3, or between the second and third captures T2, T3, using the same ratio calculations and normalization described above, or between the second and third captures T2, T3 using the predicted values from the second capture T2, and between the third and fourth captures T3, T4 using the predicted values from the third capture T3.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

While the technology has been described with reference to specific exemplary embodiments, various modifications and changes may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An imaging device comprising:
    an array of pixels arranged in rows and columns, wherein the array of pixels generates:
        first image pixel data corresponding to pixels having a first exposure time, and
        second image pixel data corresponding to pixels having a second exposure time,
            wherein the first exposure time is greater than the second exposure time; and
        wherein the pixels used to generate the first and second image pixel data have the same spatial locations within the array;
    a color filter overlaying the array pixels and comprising a plurality of color filters; and
    an image signal processor coupled to the array of pixels, wherein the image signal processor:
        receives the first image pixel data and second image pixel data;
        identifies valid and invalid image pixel data based on pixel data values;
        generate a ratio utilizing the valid image pixel data;

wherein:
the ratio comprises a first individual pixel value divided by a second individual pixel value;
the first individual pixel value corresponds to a first color from the plurality of color filters;
the second individual pixel value corresponds to a second color from the plurality of color filters that is different from the first color; and
the first and second individual pixel values have a same exposure time;
normalizes the computed ratio using an ideal ratio, wherein the ideal ratio is the first exposure time divided by the second exposure time; and
modifies the second image pixel data using the normalized computed ratio.

2. The imaging device of claim 1, wherein the invalid pixel data comprises:
first image pixel data with a value above a first predetermined threshold, and
second image pixel data with a value below a second predetermined threshold.

3. The imaging device of claim 1, wherein the valid pixel data comprises first image pixel data with a value below a first predetermined threshold.

4. The imaging device of claim 3, wherein the valid pixel data further comprises second image pixel data with a value above a second predetermined threshold.

5. The imaging device of claim 1, wherein the image signal processor further identifies the valid image pixel data within a neighborhood of each identified invalid image pixel data.

6. The imaging device of claim 5, wherein the image signal processor computes a representative value for the identified valid image pixel data within the neighborhood of the identified invalid image pixel data and replacing the identified invalid image pixel data with the representative value.

7. The imaging device of claim 1, wherein the first and second individual pixel values are generated by pixels that share at least one of: a same row and a same column.

8. The imaging device of claim 1, wherein the first and second individual pixel values are generated by pixels that are directly adjacent to each other.

9. A method for reducing spatial artifacts in multi-exposure images comprising:
generating, with an image sensor comprising an array of color pixels arranged in rows and columns, first image pixel data corresponding to pixels having a first exposure time, and second image pixel data corresponding to pixels having a second exposure time, wherein the first exposure time is greater than the second exposure time; wherein the pixels used to generate the first and second image pixel data have the same spatial locations within the array; wherein the first and second image pixel data comprise a value representing light intensity;
identifying whether the value is one of a valid or an invalid image pixel data;
generating a ratio utilizing the valid image pixel data;
wherein:
the ratio comprises a first individual pixel value divided by a second individual pixel value;
the first individual pixel value corresponds to a first color;
the second individual pixel value corresponds to a second color that is different from the first color; and
the first and second individual pixel values have a same exposure time;
normalizing the computed ratio utilizing an ideal ratio, wherein the ideal ratio is the first exposure time divided by the second exposure time; and
modifying the second image pixel data using the normalized ratio.

10. The method of claim 9, wherein the value is invalid if the value is greater than a first predetermined threshold.

11. The method of claim 10, wherein the value is invalid if the value is less than a second predetermined threshold.

12. The method of claim 9, wherein the value is valid if the value is between a first predetermined threshold and a second predetermined threshold.

13. The method of claim 9, wherein the image signal processor further identifies the valid image pixel data within a neighborhood of each identified invalid image pixel data.

14. The method of claim 13, wherein the image signal processor computes a representative value for the valid image pixel within a neighborhood of the invalid pixel and replacing the invalid pixel value with the average pixel value.

15. The method of claim 9, further comprising a color filter array disposed over the array of pixels, wherein the color filter array comprises the first color and the second color.

16. The method of claim 9, wherein the first and second individual pixel values are generated by pixels that share at least one of: a same row and a same column.

17. The method of claim 9, wherein the first and second individual pixel values are generated by pixels that are directly adjacent to each other.

18. A system for producing flicker-free images of a scene illuminated by a light using an alternating current source, comprising:
an image sensor, comprising:
a color filter array comprising a plurality of color filters situated on an array of pixels arranged in rows and columns, wherein the image sensor obtains:
first image pixel data corresponding to pixels having a first exposure time, and
second image pixel data corresponding to pixels having a second exposure time;
wherein the first exposure time is greater than the second exposure time;
wherein the pixels used to generate the first and second image pixel data have the same spatial locations within the array;
a storage unit coupled to the image sensor, wherein the storage unit stores the first and second image pixel data;
an image signal processor coupled to the storage unit, wherein the image signal processor:
identifies valid and invalid image pixel data based on a pixel data value;
generates a color ratio utilizing the valid image pixel data;
wherein:
the ratio comprises a first individual pixel value divided by a second individual pixel value;
the first individual pixel value corresponds to a first color from the plurality of color filters;
the second individual pixel value corresponds to a second color from the plurality of color filters that is different from the first color; and
the first and second individual pixel values have a same exposure time;

normalizes the color ratio utilizing an ideal ratio, wherein the ideal ratio is the first exposure time divided by the second exposure time;

modifies the second image pixel data using the normalized color ratio to form corrected image pixel data; and combines the corrected image pixel data with the first image pixel data to form a multi-pixel data image; and an I/O device for displaying the multi-pixel data image.

19. The system according to claim 18, wherein the first and second individual pixel values are generated by pixels that share at least one of: a same row and a same column.

20. The system according to claim 18, wherein the first and second individual pixel values are generated by pixels that are directly adjacent to each other.

* * * * *